UNITED STATES PATENT OFFICE.

HARRY N. HOLMES AND DONALD H. CAMERON, OF OBERLIN, OHIO.

PRINTING OR LITHOGRAPHING INK.

1,410,012.  Specification of Letters Patent.  Patented Mar. 21, 1922.

No Drawing.  Application filed June 6, 1921. Serial No. 475,421.

*To all whom it may concern:*

Be it known that we, HARRY N. HOLMES and DONALD H. CAMERON, citizens of the United States, residing at Oberlin, in the county of Lorain and State of Ohio, have invented certain new and useful Improvements in Printing or Lithographing Inks, of which the following is a specification.

This invention relates to inks such as are used in printing and lithographing work.

The object of the invention is to enable such inks to be diluted with a cheap liquid, doing away with the excessive cost of drying oils and other substances usually used for this purpose, but without impairing the consistency or quality of the working body and without deleterious effect upon the drying qualities of the ink.

Further objects of the invention are in part obvious and in part will appear more in detail hereinafter.

The invention comprises the ink and the process of making the same hereinafter described and claimed.

One essential characteristic of our improved ink is the emulsification into the oily body of the ink of water, watery material, or some other suitable cheap liquid, the emulsification being accomplished by the use of gum dammar as an emulsification agent. This material, gum dammar, is a resinous exudation of certain tropical or semi-tropical trees and is usually classed as a varnish or lacquer resin. We have discovered that the use of gum dammar makes possible the production of successful and practically permanent emulsions of the "water-in-oil" type, to wit, emulsions in which finely divided drops of water or some other liquid of the "water" type, such as glycerine, or any solutions of the same, or solutions of liquid or solid material in these substances, or even suspensions of solid particles in these substances. The oily body of the "water-in-oil" emulsion may be one or more of various oils, fats, greases, waxes and also many organic liquids such as benzene (benzol), toluene, carbon tetrachloride, carbon disulphide, petroleum, or its fractional distillates or residues, choloroform, or other suitable liquids that will dissolve gum dammar but which do not react harmfully therewith. In this connection we refer to our prior application for emulsion, filed April 27, 1921, Serial Number 465,020, which fully describes the properties and characteristics of these "water-in-oil" emulsions, and the subject matter of which application is hereby made a part of the present application and to which reference may be had for a more complete understanding of this invention.

Printing and lithographing inks, in general, are composed of a suitable oil or varnish, or both, carrying a desirable pigment. Other materials are sometimes added to give body or to hasten drying. For example, linseed oil, turpentine, china wood oil (tung oil) may be used as drying oils for these inks, the drying occurring by oxidation of the oil. Dilution of the ink by increase of the amount of drying oil is expensive, because these drying oils are usually expensive and the cheaper non-drying oils are not effective. Solvents, such as benzol are also not available because they thin the ink and destroy its body.

According to our invention, we incorporate in the oil or varnish body of the ink, water or watery material to any suitable amount, the incorporation thereof being effected by employing gum dammar as an emulsifying agent to produce emulsification of the water or the "watery" material in the oily body of the ink. In other words, minute drops or globules of water are dispersed in the ink and stabilized in that condition by the action of the gum dammar. These finely divided water drops act somewhat as solid material. Thirty per cent of water drops in an ink paste causes little change in the body of the paste if the water is broken up into sufficiently fine particles. By the use of inks prepared in this manner the amount of oil necessary is very materially reduced, with a consequent material reduction in cost. Each drop of water is surrounded by the oil or varnish body and therefore does not come in direct contact with the printing type or parts of the press or lithographing equipment or with the paper, but the oily body of the ink comes in contact therewith. This oily body carrying the pigment dries and allows the water to evaporate through the dried or drying oil film. The working body of the ink is not harmfully affected and rapid drying of the oil is not hindered. No material of harmful or undesirable nature is added to the ink because gum dammar is a proper ingredient of inks and without harmful effect.

As an example of how inks of this class can be prepared, we prepared one sample as follows:

Two grams of gum dammar were dissolved in a small amount of benzol as a convenient method of getting the gum dammar into solution and distributing it through the oil ink body. This gum dammar benzol solution was then added to twenty grams of an ordinary carbon black varnish ink having an oily body and was thoroughly mixed with it. The benzol was then allowed to evaporate. This produced a thorough distribution of gum dammar throughout the ink body. Ten grams of water were then incorporated into the ink by thoroughly working them in with agitation and a beating effect so as to break the water up into very finely divided drops or globules distributed throughout the ink body, producing a good emulsion of water drops in an oil varnish body.

The product of the foregoing method was found to be stable upon standing, no appreciable separation of water being detected after a considerable time. This ink, containing $33\frac{1}{3}$ per cent water, possessed as good a body as the original sample and was found to work equally as well on a printing press. The color of this particular sample was of course less intense due to the dilution, but additional amounts of carbon black or any other pigment can be readily worked into the body of the emulsified ink, either before or after the emulsification, to obtain any desired strength of color.

The invention can be readily applied to any form of printing or lithographic ink utilizing an oil or varnish body which is capable of dissolving gum dammar, or of carrying it in suspension or otherwise distributed, thereby producing in the presence of gum dammar an emulsion of the "water-in-oil" type of our prior application referred to.

What we claim is:

1. The process of preparing inks for use in printing or lithographing which consists in emulsifying in said ink in the presence of gum dammar a liquid of the "watery" type to produce an emulsion of the "water-in-oil" type.

2. The process of preparing inks for printing or lithographing which consists in dissolving gum dammar in the oily body of the ink and distributing throughout the ink body finely divided drops of a liquid of the water type to produce an emulsion.

3. The process of preparing printing or lithographing inks consisting in mixing together an oily body, gum dammar, and water, in the form of an emulsion and incorporating a pigment therein.

4. A printing or lithographing ink containing an oily body and a liquid of the "water" type as an emulsion, and gum dammar as an emulsifying agent.

In testimony whereof we hereby affix our signatures.

HARRY N. HOLMES.
DONALD H. CAMERON.